United States Patent
Myer

(10) Patent No.: US 6,791,969 B1
(45) Date of Patent: Sep. 14, 2004

(54) MULTIPLE INPUT/OUTPUT SWITCH

(75) Inventor: Robert E. Myer, Denville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,935

(22) Filed: Sep. 15, 1999

(51) Int. Cl.[7] .............................. H04L 12/28; H04J 15/00
(52) U.S. Cl. ........................................ 370/351; 370/464
(58) Field of Search ............................... 370/357, 359, 370/360, 362, 364, 365, 367, 369, 372, 376, 386–389, 413, 419, 433, 437, 438, 439, 441–443, 462, 463, 465, 478, 479, 480, 464, 351

(56) References Cited

U.S. PATENT DOCUMENTS

| | | | | |
|---|---|---|---|---|
| 5,864,535 A | * | 1/1999 | Basilico | 370/392 |
| 5,930,256 A | * | 7/1999 | Greene et al. | 370/427 |
| 6,151,297 A | * | 11/2000 | Congdon et al. | 370/216 |
| 6,240,090 B1 | * | 5/2001 | Enhager | 370/241.1 |
| 6,330,246 B1 | * | 12/2001 | Denning et al. | 370/438 |
| 6,584,114 B1 | * | 6/2003 | Flake et al. | 370/437 |
| 6,636,483 B1 | * | 10/2003 | Pannell | 370/429 |

* cited by examiner

*Primary Examiner*—Andy Lee

(57) ABSTRACT

A multiple input/output switch includes a plurality of transmission control logic units and a plurality of reception control logic units. Each of the transmission control logic units is associated with a transmission data path, and each of the reception control logic units is associated with a reception data path. Each transmission control logic unit outputs a destination code on a communication medium when the transmission control logic unit receives data. The destination code identifies a reception data path to which the data is to be sent. The reception control logic units monitor the communication medium for their respective destination codes, and when detected, send a confirmation signal to the transmission control logic unit via the communication medium. Upon receipt of the confirmation signal, the transmission control logic unit outputs the received data to the reception control logic unit via the communication medium.

20 Claims, 2 Drawing Sheets

MULTIPLE INPUT/OUTPUT SWITCH

BACKGROUND OF THE INVENTION

1. Field of the Invention

The invention relates to the field of communication, and more particularly, switching signals from multiple inputs to multiple outputs.

2. Description of Related Art

In many communication systems, a signal received on one of a first set of communication lines must be transferred to one of a second set of communication lines. Typically, a switching network or switching matrix such as shown in FIG. 4 is used to accomplish this task. As shown, a first set of communication lines 10 form a grid with a second set of communication lines 12. A switch SW is connected between each communication line in the first and second sets of communication lines 10 and 12 at each intersection thereof. Control logic (not shown for the purposes of clarity) controls the operation of the switches SW.

A signal on a communication line in the first set of communication lines 10 is transferred to a selected communication line in the second set of communication lines 12 by closing the appropriate switch SW. In the same manner, a signal is transferred from the second set of communication lines 12 to the first set of communication lines 10. Unfortunately, switching matrices require a large number of components, namely the switches, and can be quite bulky.

SUMMARY OF THE INVENTION

The multiple input/output switch according to the present invention permits the transfer of data between a plurality of data transmission paths and a plurality of data reception paths without using a number of switching elements. Data received on a transmission data path is transferred, via a communication medium, by a transmission control logic unit associated therewith to a reception control logic unit associated with a reception data path for which the data is destined. The transfer is accomplished using known wireless communication techniques, eliminating the need for switching elements and without restrictions on the frequencies used to transfer data.

BRIEF DESCRIPTION OF THE DRAWINGS

The present invention will become more fully understood from the detailed description given hereinbelow and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
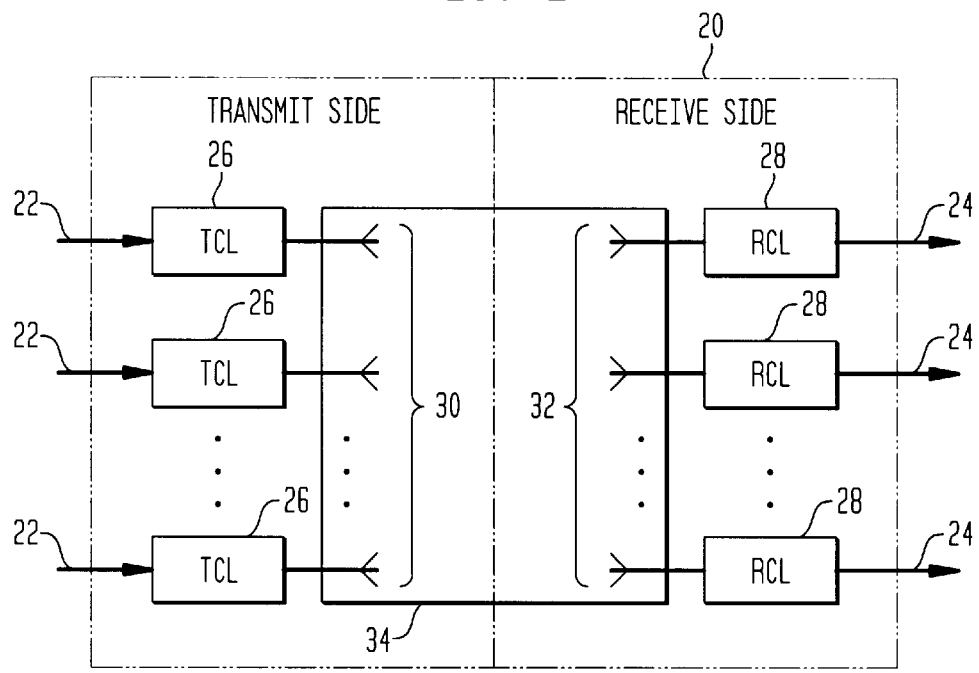
FIG. 1 illustrates a multiple input/output switch according to one embodiment of the present invention.
Figure 2:
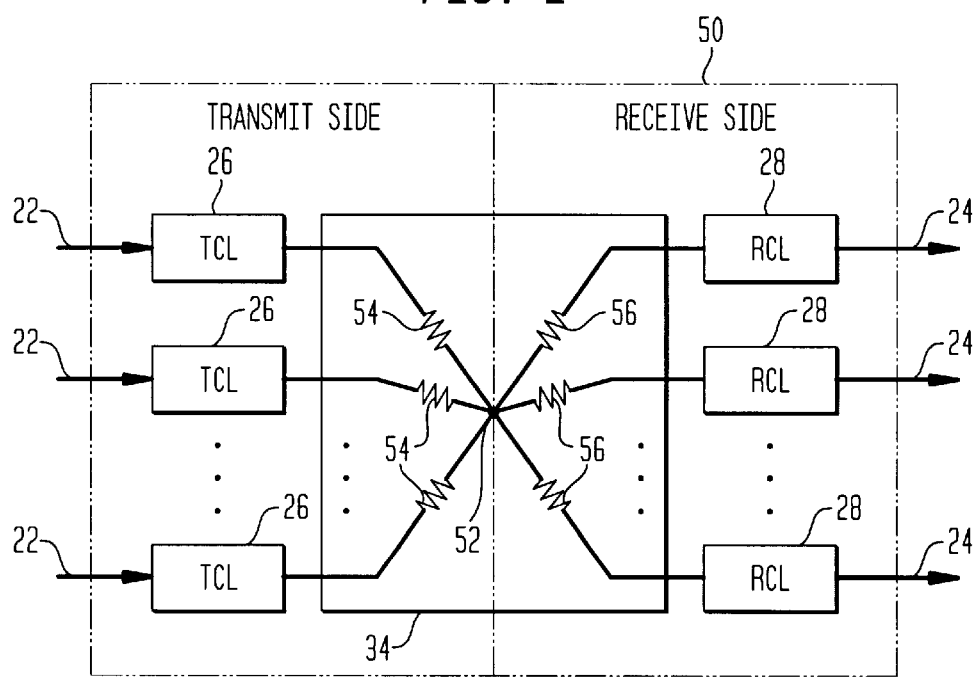
FIG. 2 illustrates a multiple input/output switch according to another embodiment of the present invention.
Figure 3:
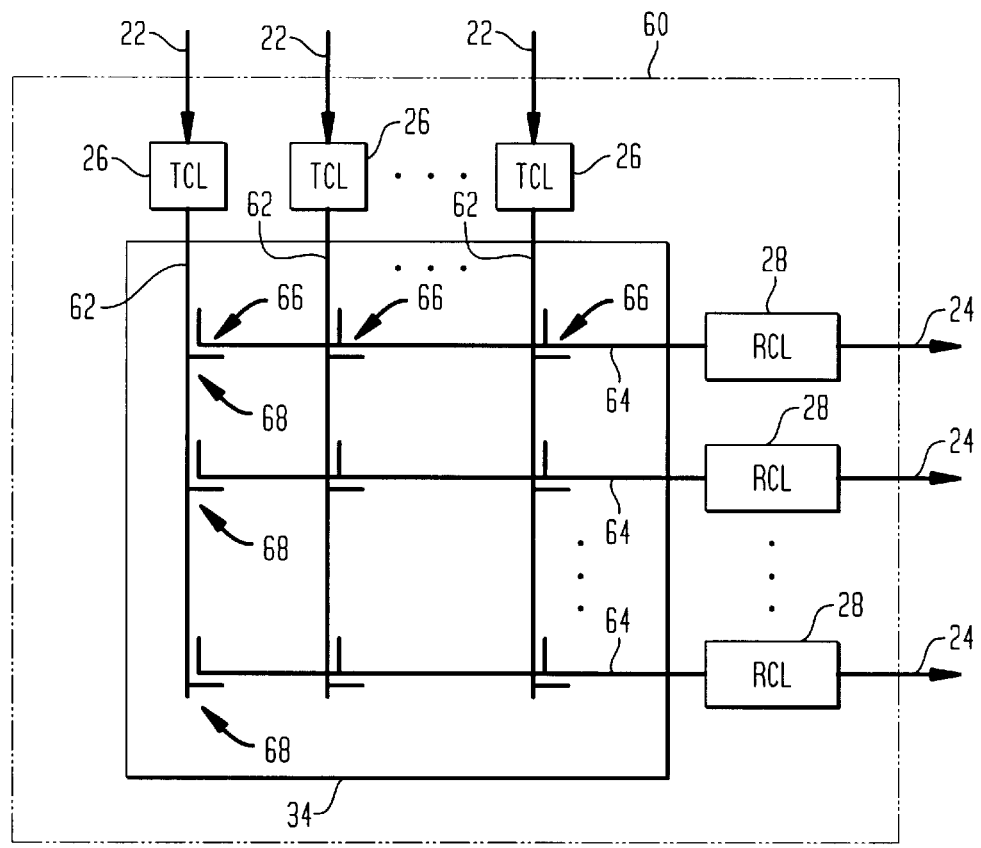
FIG. 3 illustrates a multiple input/output switch according to a further embodiment of the present invention.
Figure 4:
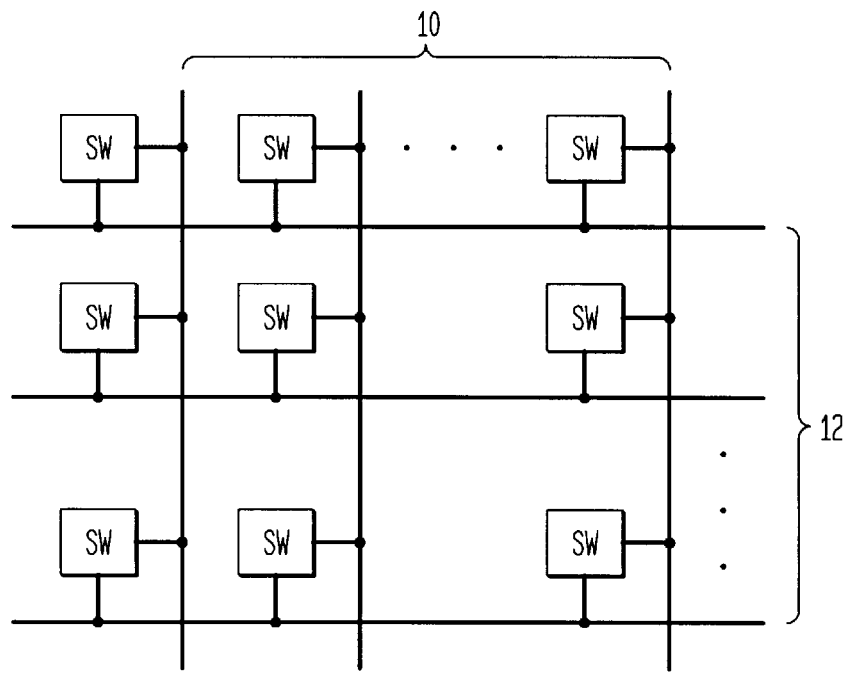
FIG. 4 illustrates a prior art switching matrix.

FIGS. 1–3 illustrate different embodiments of a multiple input/output switch according to the present invention. To simplify the description, the switch in each embodiment will be described as having a transmit side and a receive side. However, it should be understood that each side of the switch can perform both transmit and receive functions. Furthermore, the structure of each switch will be described first, then the operation of the switches will be described.

As shown in FIG. 1, a multiple input/output switch 20 is connected to a plurality of transmission data paths 22 on the transmit side and is connected to a plurality of reception data paths 24 on the receive side. Within the switch 20, each transmission data path 22 is connected to a transmission control logic unit 26 and each reception data path 24 is connected to a reception control logic unit 28.

Each of the transmission control logic units 26 outputs signals to one of a first set of antennas 30 (hereinafter referred to individually as "first antenna 30"), and each of the reception control logic units 28 receives signals from one of a second set of antennas 32 (hereinafter referred to individually as "second antenna 32"). A shield housing 34 encloses the first and second antennas 30 and 32, and shields the first and second antennas 30 and 32 from electromagnetic interference. In this embodiment, data is transferred over-the-air between the transmission and reception control logic units 26 and 28 via the first and second antennas 30 and 32.

The embodiment of the multiple input/output switch 50 illustrated in FIG. 2 is the same as the embodiment of the multiple input/output switch 20 illustrated FIG. 1 except for the communication medium within the housing 34. Accordingly, only the differences between FIGS. 1 and 2 will be described for the sake of brevity.

As shown in FIG. 2, the output of each transmission control logic unit 26 is connected to a common node 52 by a respective first resistor 54, and the input of each reception control logic unit 28 is connected to the common node 52 by a respective second resistor 56. In this embodiment, data is transferred between the transmission and reception control logic units 26 and 28 via the first resistors 54, the common node 52, and the second resistors 56.

The embodiment of the multiple input/output switch 60 illustrated in FIG. 3 is the same as the embodiment of the multiple input/output switch 20 illustrated FIG. 1 except for the communication medium within the housing 34. Accordingly, only the differences between FIGS. 1 and 3 will be described for the sake of brevity.

As shown in FIG. 3, the output of each transmission control logic unit 26 is connected to a respective first transmission line 62, and the input of each reception control logic unit 28 is connected to a respective second transmission line 64. Each of the second transmission lines 64 is coupled to each of the first transmission lines 62 by respective directional couplers 66, and each of the first transmission lines 62 is coupled to each of the second transmission lines 54 by respective directional couplers 68. In this embodiment, data is transferred between the transmission and reception control logic units 26 and 28 via the first transmission lines 62, the directional couplers 66 and 68, and the second transmission lines 64.

Next, the operation of the present invention will be described. The operation of each embodiment is the same except for the communication medium over which signals travel in the different embodiments.

Each of the transmission control logic units 26 and each of the reception control logic units 28 has a unique code associated therewith. The transmission control logic unit 26 stores the code and reception data path 24 associated with each reception control logic unit 28. When a transmission control logic unit 26 receives data destined for a particular reception data path 24 identified in the received data or identified by a control signal (not shown) received by the transmission control logic unit 26, the transmission control logic unit 26, based on this stored information, determines the code for the identified reception control logic unit 28 to which the received data should be sent. The transmission control logic unit 26 then sends a set-up request message at a predetermined set-up frequency; preferably common to all of the transmission control logic units 26. The set-up request message includes a se-up request, the code of the transmission control logic unit 26 and the code of the identified reception control logic unit 26.

Each of the reception control logic units 28 monitors signals received via the communication medium in the shield housing 34 at the set-up frequency. When the identified reception control logic unit 28 recognizes a set-up request message including the code associated therewith, the identified reception control logic unit 28 (1) sends back an acknowledgement message at an access frequency associated with the transmission control logic unit 26 and (2) begins monitoring a traffic frequency associated with the transmission control logic unit 26.

Each transmission control logic unit 26 has a different access frequency and a different traffic frequency associated therewith. Each reception control logic unit 28 stores the code for each transmission control logic unit 26 and the access and traffic frequencies associated therewith. Based on the code of the transmission control logic unit 26 in the set-up message, the identified reception control logic unit 28 determines the access frequency on which to send the acknowledgement message and the traffic frequency to monitor for data.

Upon receipt of the acknowledgement message, the transmission control logic unit 26 transmits the received data at the traffic frequency associated therewith. The reception control logic unit 28 receives the data via the communication medium at the traffic frequency and outputs the received data over the reception data path 24 associated therewith.

In an alternative embodiment, predetermined access and traffic frequencies are not assigned to each transmission control logic unit 26, nor are unique codes assigned to the transmission control logic units 26. Accordingly, the set-up request message does not include the code of the transmission control logic unit 26. Instead, the set-up request message further includes a traffic frequency. The identified reception control logic 28, upon receipt of the set-up request message generates the acknowledgement message, and begins monitoring the traffic frequency for data. The acknowledgement message output from the identified reception control logic unit 28 provides an acknowledgement of the set-up request message and the code of the identified reception control logic 28, Furthermore, the acknowledgement message is output at the set-up frequency. Even though the identified reception control logic unit 28 recognizes its code within the acknowledgement message, the message is ignored because the message is also recognized as an acknowledgement message.

The transmission control logic unit 26 sending the set-up request message stores the code of the identified reception control logic unit 28, and monitors the set-up frequency for an acknowledgement message. When the transmission control logic unit 26 recognizes an acknowledgement message with the code of the identified reception control logic unit 28, receipt of the set-up request message is confirmed. The transmission control logic unit 26 then sends the received data at the traffic frequency.

One skilled in the art will recognize that numerous techniques exist for transferring data from the transmission control logic units 26 to the reception control logic units 28. For example, data could be transferred according to any well known wireless communication technique such as frequency division multiple access (FDMA) techniques, time division multiple access (TDMA) techniques, and code division multiple access techniques (CDMA). It will also be appreciated that because of the small scale of the multiple input/output switch and the shield housing 34, no restrictions on the frequencies used for communication between the control logic units exists as in wireless communication systems.

Because wireless communication techniques are used without restriction, the bandwidth at which data is communicated can be controlled to selectively provide for the communication of high speed data, video, or other types of data requiring large bandwidth. Also, the use of wireless communication techniques simplifies connecting multiple transmission data paths with a single reception data path, or connecting another transmission data path to a reception data path already connected to a transmission data path.

One skilled in the art will also recognize that while the transfer of data has been described as unidirectional, bi-directional transfer of data is possible with the control logic unit for each data path performing both transmission and reception control functions.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A multiple input/output switch, comprising:
    a plurality of transmission control logic units, each transmission control logic unit associated with a transmission data path, each transmission control logic unit outputting a destination code on a switchless communication medium when said transmission control logic unit receives data, said destination code identifying a reception data path to which said data is to be sent, and said transmission control logic unit outputting said received data on said switchless communication medium when a confirmation signal is received; and
    a plurality of reception control logic units, each reception control logic unit associated with a reception data path, each reception control logic unit monitoring signals received from said switchless communication medium, detecting said identification code of said associated reception data path in said monitored signals, and outputting said confirmation signal via said switchless communication medium when said identification code of said associated reception data path is detected in said monitored signals.

2. The switch of claim 1, wherein each of said plurality of reception control logic units receives said received data output via said communication medium after outputting said confirmation signal, and outputs said received data on said associated reception data path.

3. The switch of claim 1, wherein
    said transmission control logic units and said reception control logic units control communicate over said communication medium according to a frequency division multiple access technique.

4. The switch of claim 1, wherein
    said transmission control logic units and said reception control logic units control communicate over said communication medium according to a time division multiple access technique.

5. The switch of claim 1, wherein
said transmission control logic units and said reception control logic units control communicate over said communication medium according to a code division multiple access technique.

6. The switch of claim 1, wherein
said transmission control logic units and said reception control logic units control communicate over said communication medium according to at least one of a frequency division multiple access technique, a time division multiple access technique and a code division multiple access technique.

7. The switch of claim 1, wherein
said transmission control logic units each transmit said destination code at a same frequency.

8. The switch of claim 1, wherein
each transmission control logic unit sends said received data via said communication medium using a transmission antenna; and
each reception control logic unit receives said received data via said communication medium using a reception antenna.

9. The switch of claim 8, further comprising:
a shielding structure in which said transmission and reception antennas are enclosed.

10. The switch of claim 1, further comprising:
a plurality of transmission resistors and a plurality of reception resistors serving as said communication medium, each of said transmission resistors connecting one of said transmission data paths to a common node, and each of said reception resistors connecting one of said reception data paths to said common node.

11. The switch of claim 10, further comprising:
a shield housing enclosing said plurality of transmission and reception resistors.

12. The switch of claim 1, furthering comprising:
a first plurality of transmission lines, each of said first plurality of transmission lines connected to a respective one of said transmission control logic units; and
a second plurality of transmission lines, each of said second plurality of transmission lines connected to a respective one of said reception control logic units, each of said second plurality of transmission lines being coupled to each of said first plurality of transmission lines by an associated directional coupler, and each of said first plurality of transmission lines being coupled to each of said second plurality of transmission lines by an associated direction coupler, the first and second plurality of transmission lines and said associated directional couplers serving as said communication medium.

13. The switch of claim 12, further comprising:
a shield housing enclosing said plurality of first transmission lines and said plurality of second transmission lines.

14. The switch of claim 1, further comprising:
a shield housing enclosing said communication medium.

15. A multiple input/output switch, comprising:
a plurality of transmission control logic units, each transmission control logic unit associated with a transmission data path, each transmission control logic unit outputting a destination code on a communication medium when said transmission control logic unit receives data, said destination code identifying a reception data path to which said data is to be sent, and said transmission control logic unit outputting said received data on said communication medium when a confirmation signal is received;
a plurality of reception control logic units, each reception control logic unit associated with a reception data path, each reception control logic unit monitoring signals received from said communication medium, detecting said identification code of said associated reception data path in said monitored signals, and outputting said confirmation signal via said communication medium when said identification code of said associated reception data path is detected in said monitored signals; and
wherein said transmission control logic units and said reception control logic units control communicate over said communication medium according to a frequency division multiple access technique.

16. A multiple input/output switch, comprising:
a plurality of transmission control logic units, each transmission control logic unit associated with a transmission data path, each transmission control logic unit outputting a destination code on a communication medium when said transmission control logic unit receives data, said destination code identifying a reception data path to which said data is to be sent, and said transmission control logic unit outputting said received data on said communication medium when a confirmation signal is received;
a plurality of reception control logic units, each reception control logic unit associated with a reception data path, each reception control logic unit monitoring signals received from said communication medium, detecting said identification code of said associated reception data path in said monitored signals, and outputting said confirmation signal via said communication medium when said identification code of said associated reception data path is detected in said monitored signals; and
wherein said transmission control logic units and said reception control logic units control communicate over said communication medium according to a code division multiple access technique.

17. A multiple input/output switch, comprising:
a plurality of transmission control logic units, each transmission control logic unit associated with a transmission data path, each transmission control logic unit outputting a destination code on a communication medium when said transmission control logic unit receives data, said destination code identifying a reception data path to which said data is to be sent, and said transmission control logic unit outputting said received data on said communication medium when a confirmation signal is received;
a plurality of reception control logic units, each reception control logic unit associated with a reception data path, each reception control logic unit monitoring signals received from said communication medium, detecting said identification code of said associated reception data path in said monitored signals, and outputting said confirmation signal via said communication medium when said identification code of said associated reception data path is detected in said monitored signals; and
wherein said transmission control logic units each transmit said destination code at a same frequency.

18. A multiple input/output switch, comprising:
a plurality of transmission control logic units, each transmission control logic unit associated with a transmission data path, each transmission control logic unit outputting a destination code on a communication medium when said transmission control logic unit receives data, said destination code identifying a reception data path to which said data is to be sent, and said transmission control logic unit outputting said received data on said communication medium when a confirmation signal is received;

a plurality of reception control logic units, each reception control logic unit associated with a reception data path, each reception control logic unit monitoring signals received from said communication medium, detecting said identification code of said associated reception data path in said monitored signals, and outputting said confirmation signal via said communication medium when said identification code of said associated reception data path is detected in said monitored signals;

wherein each transmission control logic unit sends said received data via said communication medium using a transmission antenna; and each reception control logic unit receives said received data via said communication medium using a reception antenna.

19. A multiple input/output switch, comprising:

a plurality of transmission control logic units, each transmission control logic unit associated with a transmission data path, each transmission control logic unit outputting a destination code on a communication medium when said transmission control logic unit receives data, said destination code identifying a reception data path to which said data is to be sent, and said transmission control logic unit outputting said received data on said communication medium when a confirmation signal is received;

a plurality of reception control logic units, each reception control logic unit associated with a reception data path, each reception control logic unit monitoring signals received from said communication medium, detecting said identification code of said associated reception data path in said monitored signals, and outputting said confirmation signal via said communication medium when said identification code of said associated reception data path is detected in said monitored signals; and a plurality of transmission resistors and a plurality of reception resistors serving as said communication medium, each of said transmission resistors connecting one of said transmission data paths to a common node, and each of said reception resistors connecting one of said reception data paths to said common node.

20. A multiple input/output switch, comprising:

a plurality of transmission control logic units, each transmission control logic unit associated with a transmission data path, each transmission control logic unit outputting a destination code on a communication medium when said transmission control logic unit receives data, said destination code identiing a reception data path to which said data is to be sent, and said transmission control logic unit outputting said received data on said communication medium when a confirmation signal is received;

a plurality of reception control logic units, each reception control logic unit associated with a reception data path, each reception control logic unit monitoring signals received from said communication medium, detecting said identification code of said associated reception data path in said monitored signals, and outputting said confirmation signal via said communication medium when said identification code of said associated reception data path is detected in said monitored signals;

a first plurality of transmission lines, each of said first plurality of transmission lines connected to a respective one of said transmission control logic units; and a second plurality of transmission lines, each of said second plurality of transmission lines connected to a respective one of said reception control logic units, each of said second plurality of transmission lines being coupled to each of said first plurality of transmission lines by an associated directional coupler, and each of said first plurality of transmission lines being coupled to each of said second plurality of transmission lines by an associated direction coupler, the first and second plurality of transmission lines and said associated directional couplers serving as said communication medium.

* * * * *